(12) United States Patent
Li et al.

(10) Patent No.: US 7,799,127 B2
(45) Date of Patent: Sep. 21, 2010

(54) HIGH EARLY STRENGTH ENGINEERED CEMENTITIOUS COMPOSITES

(75) Inventors: Victor C. Li, Ann Arbor, MI (US); Shuxin Wang, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 736 days.

(21) Appl. No.: 11/673,263

(22) Filed: Feb. 9, 2007

(65) Prior Publication Data
US 2007/0181040 A1    Aug. 9, 2007

Related U.S. Application Data

(60) Provisional application No. 60/771,608, filed on Feb. 9, 2006.

(51) Int. Cl.
*C04B 14/38* (2006.01)
(52) U.S. Cl. .................. 106/644; 106/705; 106/718; 106/724; 106/726; 106/727; 106/733; 106/737
(58) Field of Classification Search ............... 106/644, 106/724, 737, 705, 718, 726, 727, 733
See application file for complete search history.

(56) References Cited

U.S. PATENT DOCUMENTS

| | | | |
|---|---|---|---|
| 6,809,131 B2 | 10/2004 | Li et al. | |
| 6,969,423 B2 * | 11/2005 | Li et al. | 106/672 |
| 7,169,224 B2 * | 1/2007 | Li et al. | 106/644 |
| 2005/0241534 A1 * | 11/2005 | Li et al. | 106/672 |

OTHER PUBLICATIONS

Li, V.C., "Postcrack Scaling Relations For Fiber-Reinforced Cementitious Composites," J. Materials in Civil Engineering, ASCE, pp. 41-57, V.4, No. 1, 1992.
Lin, et al., "On Interface Property Characterization and Performance of Fiber-Reinforced Cementitious Composites," J. Concrete Science and Engineering, RILEM, pp. 173-184, No. 1, Sep. 1999.
Li, et al., "Tensile Strain-Hardening Behavior of Polyvinyl alcohol Engineered Cementitious Composite (PVA-ECC)," ACI Materials Journal, pp. 483-492, Title No. 98-M52, No. 6, Nov.-Dec. 2001.
Redon, et al., "Measuring and Modifying Interface Properties of PVA Fibers in ECC Matrix," J. Materials in Civil Engineering, pp. 399-406, ASCE, V. 13, No. 6, Nov.-Dec. 2001.
Wang, et al. "High-Early-Strength Engineered Cementitious Composites," ACI Materials Journal, pp. 97-105, Title No. 103-M11, V. 103, No. 2, Mar.-Apr. 2006.

* cited by examiner

*Primary Examiner*—Paul Marcantoni
(74) *Attorney, Agent, or Firm*—Brooks Kushman P.C.

(57) ABSTRACT

Rapid repair and retrofit of existing infrastructures demand durable high early strength materials that not only deliver sufficient strength within a few hours of placement but also significantly prolong the maintenance interval. The invention comprises a class of newly developed polyvinyl alcohol (PVA) fiber-reinforced high early strength engineered cementitious composites (ECC) materials featuring extraordinary ductility. The tailoring of preexisting flaw size distribution through non-matrix interactive crack initiators in the composite matrix results in high tensile ductility. The resulting high early strength ECC materials are capable of delivering a compressive strength of 21 MPa (3.0 ksi) within 4 hours after placement and retaining long-term tensile strain capacity above 2%.

30 Claims, 3 Drawing Sheets

Compressive strength development of rapid-hardening cement-based mixtures.

*Compressive strength development of rapid-hardening cement-based mixtures.*

*Tensile behavior of Type III cement-based mixture without artificial flaws (Mixture HP08) at 28 days.*

*Tensile behavior of Type III cement-based Mixture HP09 with artificial flaws (PS beads 5.0 vol. %) at ages of 5 hours and 50 days.*

HIGH EARLY STRENGTH ENGINEERED CEMENTITIOUS COMPOSITES

CROSS-REFERENCE TO RELATED APPLICATIONS

This application claims the benefit of U.S. provisional application Ser. No. 60/771,608 filed Feb. 9, 2006.

BACKGROUND OF THE INVENTION

1. Field of the Invention

The present invention relates generally to a fiber-reinforced, rapid-hardening, high early strength engineered cementitious composite (HES-ECC) concrete material. The resulting high early strength ECC materials exhibit high compressive strength within 4 hours while also exhibiting high tensile ductility for long-term durability.

2. Background Art

There is an increasing demand for durable high early strength or rapid-hardening concrete materials in repair and retrofit practices, particularly on roads where minimum traffic disruption is preferred. For instance, highway transportation authorities often require a pavement repair to be completed in 6 to 8 hours at night so that the lane can be opened to traffic the next morning. In the past two decades, intensive experimental investigations carried out by both academic and industrial groups have led to successful formulation of concrete mixtures that can attain sufficient compressive and flexural strengths at very early ages. With various early strength gain rates, these concrete mixtures obtain high early strength by using either proprietary rapid hardening cements or portland cement together with chemical accelerator admixtures.

Unfortunately, traditional concrete repairs often lack durability. It has been estimated that up to half of all concrete repairs fail. About ¾ of the failures are attributed to the lack of durability, with the remaining attributed to structural failures. Premature deterioration is more common in repair sites using high early strength concrete because many proprietary binder systems often perform unpredictably under various construction conditions. For example, reduced freezing-and-thawing resistance was found in some very high early strength concrete mixtures. Meanwhile, early age cracking, associated with autogenous shrinkage and/or thermal gradient under high temperature caused by rapid hydration, also exacerbates the deterioration. The lack of durability in concrete repair is fundamentally related to the brittleness, or lack of ductility in other words, in most repair mortars.

Conventional ductile Engineered Cementitious Composites (ECC) mixtures use Type I ordinary portland cement (OPC), which shows relatively slow strength development. As a high strength gain rate is desired, an alternative binder system is needed. In addition to strength gain rate, the selection of a binder system has to take into consideration material cost, workability, practice restrictions, and long-term durability. Furthermore, the binder must not interrupt the micromechanical conditions for multiple microcracking and tensile ductility in ECC.

Current state-of-the-art high early strength cementitious materials for rapid repair, including various rapid hardening cement-based mortars and polymer mortars, are all quasibrittle in nature. The incorporation of short reinforcing fibers, most commonly steel, glass and polypropylene fibers, without regard to proper design of fiber, matrix and interface, typically leads to a composite with tension-softening behavior and low-strain capacity despite improvement in fracture energy. Thus, these fiber-reinforced materials are not strain-hardening, and cannot be described as ductile.

The recent use of crack initiation and propagation control in composites favors long-term ductility. The effectiveness of this micromechanics design approach is highlighted through matrix microstructure tailoring described in Li et al., U.S. Pat. No. 6,969,423. However, the ECC compositions disclosed therein cannot offer high early strength. Moreover, the chemistry and cure of high early strength compositions are sufficiently different from ordinary cement such that crack initiation and propagation are expected not to be the same. The interaction of the rapid curing matrix with reinforcing fibers and crack initiators will be significantly different.

SUMMARY OF THE INVENTION

There remains a need for a type of fiber-reinforced cementitious composite delivering very high early strength and significant tensile strain capacity within 4 to 5 hours. Durability of repair using these materials is expected to be fundamentally improved due to its superior deformability, limited crack width, and compatibility to existing concrete substrates.

The prior art summarized above suggests that cementitious materials with either high early strength or tensile ductility (at 4 hrs and beyond) may have been achieved, but not both.

It has now been discovered that cementitious composites which exhibit high early strength and ductility, and which retain this ductility after full cure, can be formulated from rapid hardening cement and portland cement-based mixes which contain matrix interactive strain-hardening fibers, thermoplastic non-matrix interactive crack initiators, fine grain filler, and chemical admixtures which include dispersants and in some cases, accelerators.

DETAILED DESCRIPTION OF THE PREFERRED EMBODIMENTS

Figure 1:
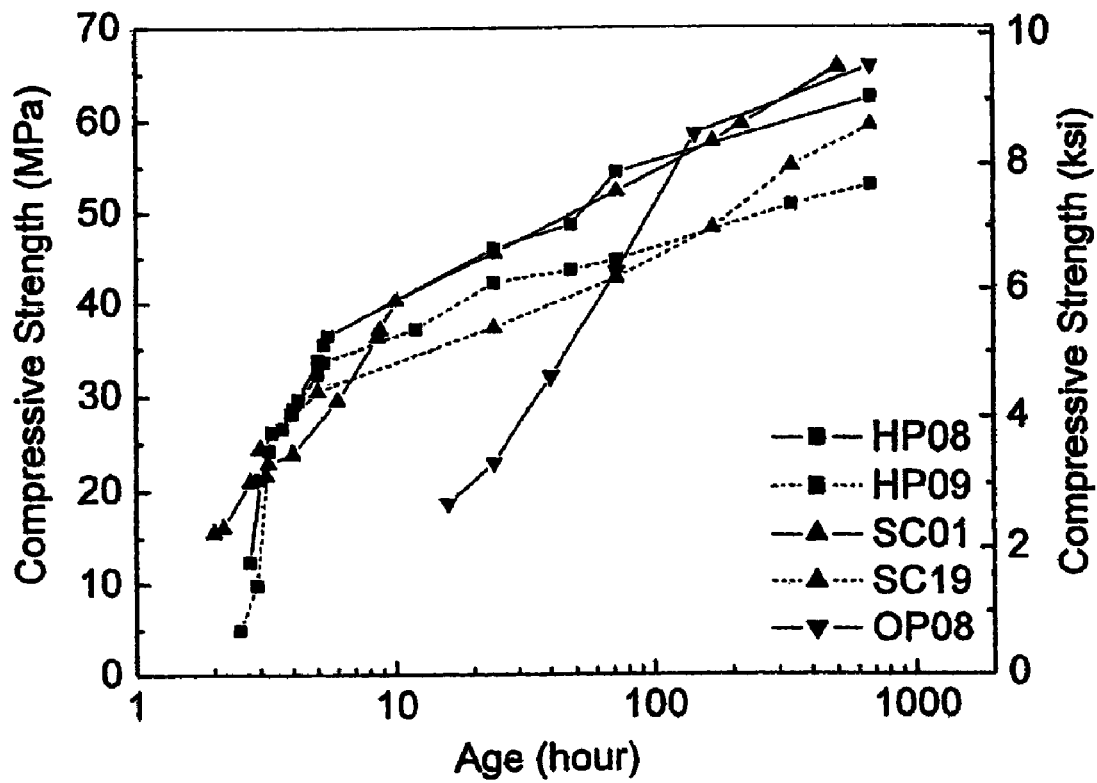
FIG. 1—Compressive strength development of rapid hardening (SC01 and SC19) and Type III (HP08 and HP09) cement based mixtures in contrast to that of an ECC mix based on Type I ordinary portland cement (OP08).

Hydraulic calcium silicates comprise hydraulic cements known as portland cements. Portland cement is a finely-ground powder produced by grinding Portland cement clinker (more than 90%), a maximum of about 5% gypsum which controls the set time, and up to 5% minor constituents (as allowed by various standards). ASTM C 150, Standard Specification for Portland Cement, defines Type I cements as general purpose ordinary portland cements (OPC) suitable for all uses where the special properties of other types are not required. Type III cements are chemically and physically similar to Type I cements except they are ground finer to produce higher early strengths. Rapid hardening cements are composed primarily with calcium sulfoaluminate and have the ability to harden within 1 hour.

Chemical admixtures may contain (a) dispersants and (b) accelerators. Chemical dispersant admixtures assist fiber dispersion and control rheology at low water to binder ratio, which is typical for achieving high early strength. Generally high range water reducers or superplasticizers are recommended. One skilled in the art is well aware of numerous dispersants, which may be selected from the group consisting of melamine formaldehyde sulfonate, or polycarboxylate based superplasticizers and combinations thereof. An exemplary melamine formaldehyde sulfonate based superplasticizer is Daracem® ML330 from W.R. Grace & C., USA. Exemplary polycarboxylate based superplasticizers include Adva® 530 from W.R. Grace & Co., USA, Glenium® 3200HES and Glenium® 3000NS both from Master Builders. Inc.

Chemical accelerator admixtures are used to gain high early strength. Chemical accelerators can be used in combination with finely ground silicate minerals and hydraulic portland cement to achieve rapid strength gain. One skilled in the art is also well aware of numerous accelerants which may be selected from the group consisting of soluble inorganic salts including but not limited to chlorides, bromides, fluorides, carbonates, nitrites, nitrates thiosulfates, silicates, aluminates, and alkali hydroxides or soluble organic compounds including thiocyanates, carboxylic acid salts, alkanolamine and calcium formate. An exemplary accelerator is calcium nitrate based Pozzolith® NC534 from Master Builders Inc., OH, USA. Some chemical admixtures on the market combine both a dispersant and accelerator.

Ductility, as measured in terms of tensile strain capacity, is being gradually recognized as the most critical property for durable repair. As a repair material, ductile ECC exhibits exceptional deformation capacity to resist restrained shrinkage induced cracking with wide crack width. The high-fracture toughness and multiple-cracking behavior enables ECC retrofit to effectively defuse and arrest unstable crack propagation initiated from the surrounding concrete or from the new/old concrete interface, and hence eliminate spalling or delamination failures, which are the common premature failure modes in repaired structures.

The invention thus describes a type of fiber-reinforced cementitious composite delivering very high early strength and significant tensile strain capacity. The engineered cementitious composite (ECC) materials described herein are a special type of high-performance fiber-reinforced cementitious composite (HPFRCC) featuring significant tensile ductility and moderate fiber volume fraction (typically 2%). The design of ECC is guided by micromechanics models, which provide quantitative links between composite mechanical behavior and the properties of the individual phases, that is, fiber, matrix, and interface. Using these models, the desired high tensile ductility, which is achieved by strain-hardening and multiple-cracking, is converted to a set of constraints on individual component properties. These components, that is, the fiber, the matrix, and the interface, are synergistically tailored to meet the constraints.

ECC is effective as a repair and retrofit material due to its high ductility and tight crack width. Unlike conventional tension-softening Fiber Reinforced Concrete (FRC) materials, the crack width of ECC material in the strain hardening regime is an intrinsic material property and is typically below 100 μm (0.004 in.) Because the flow rate in cracked concrete scales as the third power of the crack width and approaches zero when the crack width is below 100 μm (0.004 in.), the transport of water through cracks in ECC cover through permeation is minimal and hence prevents the corrosion of steel reinforcement underneath. In preloaded reinforced beam test under wet-dry cycles of a chloride environment, Hiraishi et al. "Steel Corrosion at Bending Cracks in Ductile Fiber Reinforced Cementitious Composites," *Proceedings of the JCI Symposium on Ductile Fiber Reinforced Cementitious Composites* (DFRCC), Tokyo, Japan (2003) demonstrated that the steel reinforcement corrosion was significantly reduced when concrete was replaced by ECC. Furthermore, even if corrosion occurs, the strain-hardening capacity of ECC will accommodate the expansion induced by corrosion and prevent occurrence of spalling. Therefore, repair and retrofit with ECC material may significantly extend the infrastructure service life.

The foregoing paragraphs describe ECC materials which are conventional in compressive strength-gain rates. These materials require extended cure before physical properties reach desirable levels. For example, compressive strength is as low as 18 MPa (2.6 ksi) even after 16 hours. This length of time for strength development is unsuitable for many repairs applications. However, simply replacing ECC containing ordinary cement such as portland cement with rapid hardening cements or adding accelerators has been found to be unacceptable due to the loss of tensile ductility, especially in the long-term.

Strain-hardening behavior of ECC materials is obtained from careful tailoring of the constituent properties. Specifically, these properties are chosen such that steady state cracking prevails under tension. This requires the crack tip toughness $J_{tip}$ to be less than the complementary energy $J_b'$ calculated from the fiber bridging stress σ versus crack opening δ curve.

$$J_{tip} \leq \sigma_0 \delta_0 - \int_0^{\delta_0} \sigma(\delta) d\delta \equiv J_b' \quad (1)$$

$$J_{tip} = \frac{K_m}{E_m} \quad (2)$$

is the maximum fiber bridging stress corresponding to the crack opening $\delta_0$; $E_m$ is the matrix elastic modulus; and $K_m$ is the fracture toughness. Equation (1) is obtained by considering the balance of energy changes during extension of the steady state flat crack. The stress-crack opening relationship σ(δ), which can be viewed as the constitutive law of fiber bridging behavior, is derived by using analytic tools of fracture mechanics, micromechanics, and statistics. In particular, the energetics of tunnel crack propagation along fiber/matrix is used to quantify the debonding process and the bridging force of a fiber with given embedment length; statistics are introduced to describe the random location and orientation of fibers. The random orientation of fiber also necessitates the accounting of the mechanics of interaction between an inclined fiber and the matrix crack. Another condition for pseudo strain-hardening is that the tensile first crack strength $\sigma_{fc}$ must not exceed the maximum bridging stress $\sigma_0$, $$\sigma_{fc} < \sigma_0 \quad (3)$$

where $\sigma_{fc}$ is determined by the maximum preexisting flaw size max[$a_0$] and the matrix fracture toughness $K_m$. Details of these micromechanical analyses are found in, Li, V. C., "Post-Crack Scaling Relations for Fiber-Reinforced Cementitious Composites", JOURNAL OF MATERIALS IN CIVIL ENGINEERING, ASCE, V.4, No. 1, 1992, Lin, et al, "On Interface Property Characterization and Performance of Fiber-Reinforced Cementitious Composites," JOURNAL OF CONCRETE SCIENCE AND ENGINEERING, RILEM, No. 1, 1999, and Li, et al. "Tensile Strain-Hardening Behavior of PVA-ECC," ACI MATERIALS JOURNAL, V. 98, No. 6, November-December 2001, pp. 483-492, which are incorporated by reference. Satisfaction of Eq. (1) and (3) is necessary to achieve ECC behavior. Otherwise, normal tensile softening FRC behavior will result.

The shape of the σ(δ) curve, which determines the value of complementary energy $J_b'$, is further related to a number of fiber/matrix interaction mechanisms. For hydrophilic polyvinyl alcohol (PVA) fiber, which has been used for the reinforcement of ECC materials, the fiber/matrix interaction is characterized by interfacial frictional stress $\tau_0$, chemical bond $G_d$, and slip-hardening coefficient β accounting for the slip-hardening behavior during fiber pullout. In addition, snubbing coefficient f and strength reduction factor f' are introduced to account for the interaction between fiber and matrix as well as the reduction of fiber strength when pulled at an inclined angle. Besides the interfacial properties, the σ(δ) curve is also governed by the fiber content $V_f$, fiber diameter $d_f$, length $L_f$, and Young's Modulus $E_f$.

The aforementioned steady state cracking criteria calls for high margin between $J_b'$ and $J_{tip}$, for example, the moderate matrix toughness and high complementary energy. The latter further requires judicious control of fiber geometry and interface properties such that fiber could be pulled out under sufficient resistance with limited amount of rupture. For the polyvinyl alcohol (PVA) fiber used in ECC, special surface treatment (oiling) is applied to the fiber production during production to reduce the excessive bond to cementitious matrix. Additionally, the regular ECC mixtures contain high content of water and fly ash for controlling matrix toughness and interface properties. In the design of high early strength ECC, however, fly ash content has to be reduced and a low water-cement ratio (w/c) is preferred for quick strength gain at early ages. The use of high-early-strength cement may also alter the interface properties, mostly unfavorable to high complementary energy, and at the same time leads to rapid matrix toughness gain with time. These changes make it more difficult to satisfy the condition expressed in Eq. (1), resulting in the loss of tensile ductility.

When the margin between $J_b'$ and $J_{tip}$ is small, it is often desirable to control pre-existing flaw distribution in the matrix to retain high strain capacity. While Eq. (1) and (3) guarantee the occurrence of multiple-cracking, the number of the microcracks that could be developed (the multiple-crack saturation level) is governed by the flaw size and their spatial distribution. Limited by the peak bridging stress, a lower bound of critical flaw size $c_{mc}$ is set such that only those flaws larger than $c_{mc}$ can be activated prior to reaching $\sigma_0$ and contribute to multiple cracking. Therefore, to achieve saturated multiple cracking, a sufficient number of such large flaws must exist in the matrix as crack initiators. In regular ECC without explicit control of flaw size distribution, low toughness matrix is often used such that the reduced $c_{mc}$ would produce adequate margin to activate a large number of desirable microcracks.

High early strength ECC for rapid repair applications should meet minimum strength requirements before the structure can be returned to service. While there are no standards for minimum compressive strength, several target compressive and flexural strengths are described in publications and by State Departments of Transportation. The Federal Highway Administration's FHWA MANUAL OF PRACTICE: MATERIALS AND PROCEDURES FOR RAPID REPAIR OF PARTIAL-DEPTH SPALLS IN CONCRETE PAVEMENTS recommends a compressive strength of 6.9 MPa (1.0 ksi) and flexural strength of 3.1 MPa (450 psi) for high early strength concrete 4 hours after placement. The compositions of the present invention exhibit a minimum strength requirement of 21 MPa (3 ksi) in compression strength and 3.5 MPa (500 psi) in flexural strength 4 hours after placement.

The factors most pertinent to early strength gain rate include the binder type, water-binder ratio, chemical admixture type, and dosage. However, these same factors have adverse impact on the matrix and interface micro-mechanical properties so that a loss of ductility, especially in the long-term, results. This problem is overcome by the deliberate introduction of controlled size and amount of artificial flaws used as crack initiators. Specifically, a microstructure tailoring approach is used to recover tensile ductility by using non-matrix-interactive crack initiators such as polypropylene (PP) and polystyrene (PS) beads as artificial flaws to initiate random cracks. The size and amount of these artificial flaws must be enough to lead to saturated multiple microcracks, but must not be excessive as to deteriorate the compressive, tensile and flexural strengths. The optimized size and amount are determined through the above described micro-mechanical models. For purpose of illustration, the artificial flaws may be made up of particles in a range of up to 5 mm, preferably in a range of 1-4 mm. The type of artificial flaw is also important to ensure a weak bond between the introduced flaw and the surrounding matrix. As a result, high early strength ECC with tensile ductility exceeding 2% at all ages is achieved. The composite mixtures have satisfactory early strength, ductility, and other mechanical properties including flexural response and Young's modulus.

The examples presented herein were prepared in a Hobart-type mixer with 10 L (0.35 ft$^3$) capacity. Solid ingredients, including cement, and sand (fly ash and particles for artificial crack initiators, if applicable) were first mixed for approximately 1 minute. Water was added and the ingredients mixed for another 3 minutes. A high-range water-reducing chemical dispersant admixture was added to the mixture and once a consistent mixture was reached, fiber was slowly added. A chemical accelerator admixture, if used, was added before casting. Compressive tests, direct uniaxial tensile test, flexural behavior, single fiber pullout test and matrix fracture toughness measurements are preferred to profile the composites characteristics.

All compressive tests use cylinder specimens 76.2 mm (3 in.) in diameter by 152.4 mm (6 in.) in height. The ends of the specimens were capped with sulfur compound. Testing began at 3 hours after casting or when adequate strength had developed. The age of the specimen was recorded as the time elapse from finish of casting to testing. The mixing and casting procedure took approximately 20 to 30 minutes.

Direct uniaxial tensile test was conducted to characterize the tensile behavior of the ECC material. The coupon specimen used here measures 304.8×76.2×12.7 mm (12×3×0.5 in.). Aluminum plates were glued at the ends of the coupon specimen to facilitate gripping. Tests were conducted under displacement control at a loading rate of 0.005 mm/s (0.0002 in./s). Two external linear variable displacement transducers were attached to the specimen surface with a gauge length of approximately 180 mm (7.1 in.) to measure the displacement. Young's modules was calculated from the linear elastic portion of the uniaxial stress-strain curve prior to cracking.

Flexural behavior was measured using beam specimen with dimensions of 304.8 mm (12 in.) in length by 76.2 mm (3 in.) in width by 25.4 mm (1 in.) in depth under four point bending. The span between supports was 254 mm (10 in.) and the constant moment length was 76.2 mm (3 in.). The loading rate was 0.05 mm/s (0.002 in./s), and the displacement at the loading point was recorded. It should be noted that a flexural test is not a reliable test for validating strain-hardening behavior. It is carried out here mainly because flexural strength are specified in some repair applications.

A single fiber pullout test was conducted to measure the fiber/matrix interfacial properties, including frictional stress $\tau 0$, chemical bond $G_d$, and slip-hardening coefficient $\beta$. The specimen preparation and test method incorporated by reference can be found in Li, et al "Tensile Strain-Hardening Behavior of PVA-ECC" ACI MATERIALS JOURNAL, V. 98, No. 6, November-December 2001 pp 483-492. The data processing and calculation of the parameters, incorporated by reference, follow Redon, et al "Measuring and Modifying Interface Properties of PVA Fibers in ECC Matrix", J. MATERIALS IN CIVIL ENGINEERING, ASCE, V. 13, No. 6, 2001, pp. 399-406.

The matrix fracture toughness $K_m$ was determined by three-point bending test compliant to ASTM E 399. The beam specimen of the matrix mixture without fiber measured 304.8 mm (12 in.) in length by 76.2 mm (3 in.) in width by 38.1 mm (1.5 in.) in depth; the loading support spanned 254.0 mm (10 in.). The notch depth-to-height ratio was 0.4. Note that $J_{tip} = K_m^2/E$.

Table 1 summarizes the ingredients that provide a high early strength ECC which reaches the desired compressive strength within 4-5 hours and retains long-term ductility.

TABLE 1

Summary of Composition Components

| Ingredients | Amount | Weight Percentage |
|---|---|---|
| (a) Hydraulic cement (Type III or Rapid-hardening) | 800-1000 kg/m³ (850-900 kg/m³) | 38.2-48.5% (40.6-43.6%) |
| (b) Chemical Accelerator Admixture (for non-rapid hardening cements) | 20-30 L/m³ (23-27 L/m³) | 1.3-2.0% (1.5-1.8%) |
| (c) Matrix Interactive Fibers | 20-30 kg/m³ (23-27 kg/m³) | 1.1-1.9% (1.2-1.7%) |
| (d) Non-Matrix Interactive Crack Initiators | 35-60 kg/m³ (40-55 kg/m³) | 1.7-2.9% (1.9-2.6%) |
| (e) Fine Grained Aggregates | 600-1000 kg/m³ (700-895 kg/m³) | 28.6-47.7% (33.4-42.7%) |
| (f) Chemical Dispersant Admixture | 4-20 L/m³ (6-13 L/m³) | 0.2-1.0% (0.3-0.9%) |
| Fly Ash (may replace (b) for rapid hardening cements) | 75-100 kg/m³ (85-90 kg/m³) | 3.8-4.8% (4.1-4.3%) |
| Water (Target w/c ratio: 0.30 to 0.48) | 200-450 kg/m³ (285-350 kg/m³) | 9.5-21.5% (13.6-17.0%) |

Note:
The amounts indicated in parentheses are the preferred quantities.

The compressive strength development of high early strength ECC mixtures up to 28 days is illustrated in FIG. 1, along with that of regular ECC Mixture OP08. For the high early strength ECC mixtures, a compressive strength of 21 MPa can be achieved in 3-4 hours. The ordinary portland cement (OPC) used to prepare regular ECC OP08 (comparative example) develops the same strength only after approximately 24 hours. Compared with rapid-hardening cement (SC01 and SC19), which sets and hardens within one hour, Type III cement-based mixtures (HP08 and HP09) exhibit little strength at the first two hours even with the aid of an accelerator. Higher early strength can be readily achieved by further reducing water to binder ratio; however, the consequent increase in interface bond properties and matrix toughness diminishes the potential of developing multiple-cracking to an extent that only tension-softening behavior prevails.

Fast strength gain is recorded after the first 5 hours in both the rapid-hardening cement-based mixtures (SC01 and SC19) and the Type III portland cement-based mixtures (HP08 and HP09), in which a compressive strength of 21 MPa can be easily achieved at 3 to 4 hours after casting. This strength gain rate is sufficient for most emergency repair applications.

Figure 2:
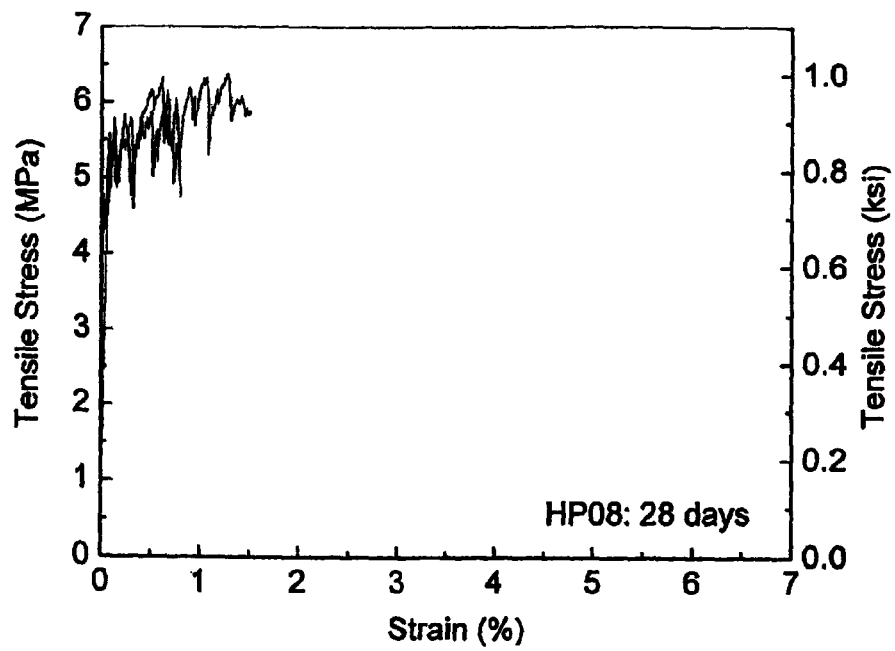
FIG. 2—Tensile behavior of ECC with Type III cement-based mixture composition without (HP08) and with (HP09) artificial crack initiators. This figure demonstrates the effectiveness of the artificial crack initiators to regain tensile ductility, which is lost due to the use of Type III cement.
Figure 2:
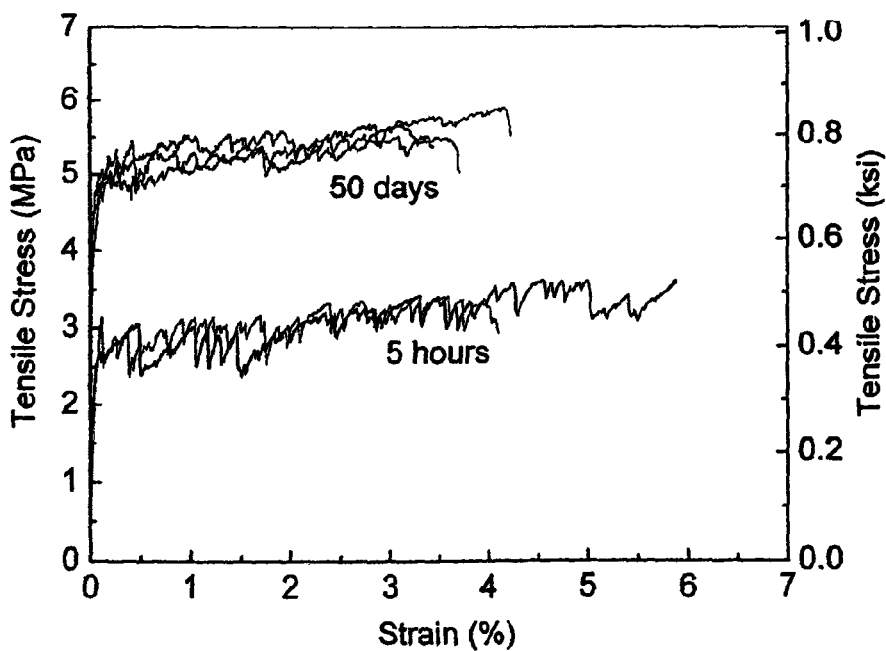
Figure 3:
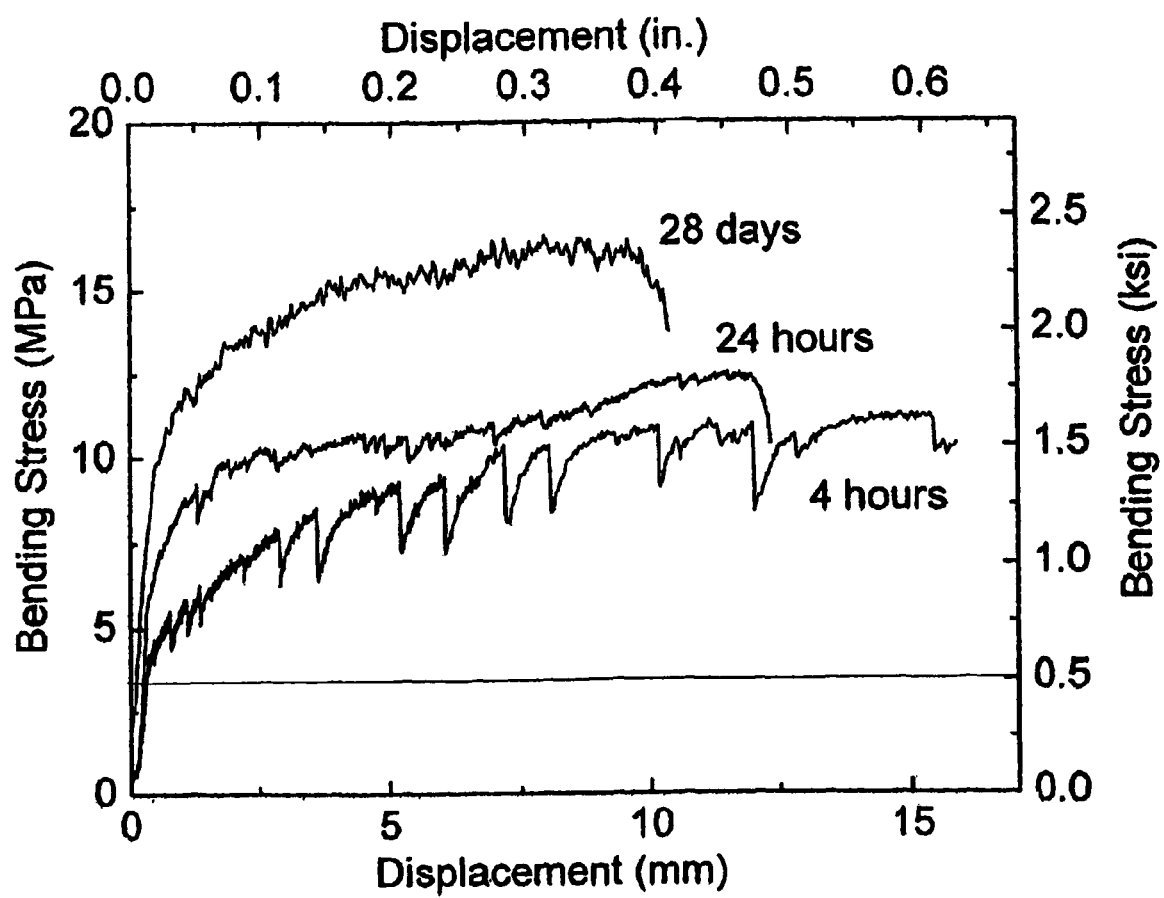
FIG. 3—Typical bending behaviors of ECC HP09 with Type III cement-based mixture composition containing artificial crack initiators at 4 hrs, 24 hrs and 28 days. This figure illustrates HP09 maintains high early age flexural strength and ductility significantly exceeding those typically specified for high early strength concrete, (3.1) MPa (450 psi), which are brittle. The horizontal line represents 3.1 MPa.

Compared with the mixtures without artificial flaws (SC01 and HP08), the corresponding inventive mixes containing non-matrix interactive crack initiators, i.e. plastic beads (SC19 and HP09) show little difference in compressive strength prior to approximately 30 MPa. The long-term compressive strength of SC19 and HP09 at 28 days is considered adequate for most applications. FIG. 2 shows the tensile behavior of HP09 and OP08 at different ages. FIG. 3 illustrates the deflection-hardening behavior of HP08, HP09 and OP08 at different ages.

Illustrations of high early strength ECC materials (examples 2 and 4) based on various binder systems, which were developed under the guidance of the micromechanical models are presented. Examples 1 and 3 are included to illustrate the loss of ductility when OPC is directly replaced by either rapid hardening cement or Type III cement, without deliberate re-tailoring of the matrix.

Rapid Hardening Cements

EXAMPLE 1

SC01

| | |
|---|---|
| Rapid Hardening Cement (Type S-30, Korea) | 900 kg/m³ |
| Fine grained aggregates: Sand | 725 kg/m³ |
| Fine Fly Ash | 90 kg/m³ |
| Matrix interactive fibers: Polyvinyl Alcohol (PVA) fiber | 25 kg/m³ |
| Chemical Accelerator & Dispersant Admixture, PT20: containing Ammonium Calcium Nitrate and Napthalene Sulfonate Salt | 14 L/m³ |
| Water | 350 kg/m³ |

A rapid decrease in strain capacity with age in SC01 was observed, however, accompanied by increase of first cracking strength and ultimate tensile strength. At 3 hours after casting, the material exhibits satisfactory strain-hardening behavior with a strain capacity above 3%. The ductility is further improved at the age of 7 hours, where an ultimate strain of 6% is demonstrated. However, the strain capacity quickly decreases to about 1.0% after 24 hours and retains only 0.7% after 3 days. This example illustrates the loss of long-term tensile ductility when the matrix is not properly tailored with non-matrix interactive crack initiators.

EXAMPLE 2

SC19

| | |
|---|---|
| Rapid Hardening Cement (Type S-30, Korea) | 860 kg/m³ |
| Fine grained aggregates: Sand | 700 kg/m³ |
| Non-matrix interactive crack initiators: Polypropylene (PP) Beads | 40 kg/m³ |
| Fine Fly Ash | 85 kg/m³ |
| Matrix interactive fibers: Polyvinyl Alcohol (PVA) fiber | 25 kg/m³ |
| Chemical Dispersant Admixture, ML330: Melamine Formaldehyde Sulfonate | 13 L/m³ |
| Water | 335 kg/m³ |

SC19, an exemplary HES-ECC, with PP beads as crack initiators leads to tensile ductility exceeding 2% and this tensile ductility was maintained after 4 hours. The introduction of PP beads at small volume fraction has demonstrated negligible effect on the early age compressive strength. At all ages, high tensile ductility and multiple-microcracking behavior are confirmed in SC19, which has the same mixture proportion as SC01 except that PP beads are introduced as artificial crack initiators at volume fraction of 4.6%. The size of the PP beads was chosen to be comparable to the largest flaws found in section examination of the uniaxial test specimens. With maturing of the matrix, however, the weakening effect of the soft PP beads prevails due to the loss of deformation compatibility between the bead and the surrounding mortar. At 28 days, a reduction of approximately 20% in compressive strength was observed in those mixtures with plastic beads.

This example illustrates the successful restoration of long-term tensile ductility through the deliberate introduction of artificial flaws (or crack initiators) of a controlled amount, small size and shape.

Type III Portland Cement

EXAMPLE 3

| HP08 | |
|---|---|
| Type III portland cement | 895 kg/m³ |
| Fine grained aggregates: Sand | 895 kg/m³ |
| Matrix interactive fibers: Polyvinyl Alcohol (PVA) fiber | 25 kg/m³ |
| Chemical Dispersant Admixture, GL3200: Polycarboxylate-based water reducer | 6 L/m³ |
| Chemical Accelerator Admixture, NC534: Calcium nitrate based accelerator | 25 L/m³ |
| Water | 290 kg/m³ |

HP08, where the fine grain size of grounded portland cement along with low w/c necessitated for rapid strength gain cause a rapid increase in Km and hence reduce the margin for multiple-cracking. HP08 shows rapid loss of tensile ductility with age. At 28 days, strain capacity is barely above 1.0%.

This example serves as another illustration of the loss of long-term tensile ductility when Type I cement is simply replaced by Type III cement.

EXAMPLE 4

| HP09 | |
|---|---|
| Type III portland cement | 580 kg/m³ |
| Fine grained aggregates: Sand | 850 kg/m³ |
| Non-matrix interactive crack initiators: Polystyrene (PS) beads | 55 kg/m³ |
| Matrix interactive fibers: Polyvinyl Alcohol (PVA) fiber | 25 kg/m³ |
| Chemical Dispersant Admixture, GL3200: Polycarboxylate-based water reducer | 6 L/m³ |
| Chemical Dispersant Admixture, NC534: Calcium nitrate based accelerator | 25 L/m³ |
| Water | 280 kg/m³ |

HP09 is also an exemplary HES-ECC with the introduction of 5.0% by volume of PS beads as artificial crack initiators. HP09 demonstrates strain capacity of 3.5% at 50 days, retaining most ductility exhibited at 5 hours in spite of 100% increase of cracking strength. The introduction of PS beads at small volume fraction in HP09 has demonstrated negligible effect on the early age compressive strength. It was also noticed that the presence of artificial crack initiators only slightly reduces the first cracking strength due to its well controlled size distribution. The high ductility of HP09 therefore originates from a more homogeneous defect system that imparts the potential of saturated multiple-cracking.

This example illustrates the successful restoration of long term-tensile ductility through the deliberate introduction of artificial flaws (crack initiators) of controlled amount, small size and shape.

It should be mentioned that microcrack width in ECC materials remains almost constant during strain-hardening regime, and increase of strain capacity for a particular system mainly relies on increase of multiple-cracking density. For HP09, the average crack width is 65 μm (0.0026 in.), and the average crack spacing is 2.5 mm (0.1 in.). Although the effectiveness of flaw size tailoring on improving ductility is highlighted, this approach should be viewed as supplemental to interface and matrix toughness control.

Type I Ordinary Portland Cement

| Comparative Example-OP08 | |
|---|---|
| Type I Ordinary Portland Cement | 583 kg/m³ |
| Fine grained aggregates: Sand | 467 kg/m³ |
| Matrix interactive fibers: Polyvinyl Alcohol (PVA) fiber | 25 kg/m³ |
| Chemical Dispersant Admixture, ML330: Melamine formaldehyde sulfonate-based high range water reducer | 15 L/m³ |
| Fine Fly Ash | 700 kg/m³ |
| Water | 300 kg/m³ |

This comparative example (OP08) shows typical ECC ductile property with tensile strain capacity of over 3%, but early compressive strength is low. The compressive strength was only able to reach 18 MPa (2.6 ksi) at 16 hours after placement. This is an ECC, but not HES-ECC.

The results of the exemplary composites SC19 and HP09 composed of non-matrix interactive crack initiators as compared to the ordinary portland cement without the artificial flaws (OP08) are indicated in Table 2. "Mechanical Properties of Examples". All three ECC composites show long-term tensile ductility in excess of 2% and comparable tensile strength. However, only the high early strength ECCs (SC19 and HP09) meet the target high early compressive strength of 21 MPa (3 ksi) within 4 hours of placement.

TABLE 2

Mechanical Properties of Examples

| Mixture ID | SC19 | HP09 | OP08 |
|---|---|---|---|
| Compressive strength, MPa (ksi) | 34 (3.5) at 3 h | 26 (3.8) at 4 h | 18 (2.6) at 16 h |
| | 37 (5.4) at 24 h | 42 (6.1) at 24 h | 24 (3.5) at 24 h |
| | 60 (8.7) at 28 days | 53 (7.7) at 28 days | 65 (9.4) at 28 days |
| Flexural strength, MPa (ksi) | 7.0 (1.0) at 3 h | 10 (1.4) at 4 h | |
| | 14 (2.0) at 24 h | 12 (1.7) at 24 h | 11 (1.6) at 24 h |
| | 16 (2.3) at 28 days | 16 (2.3) at 28 days | 15 (2.2) at 28 days |
| Tensile strength, | 3.5 (0.5) at 3 h | 3.5 (0.5) at 3 h | 3.5 (0.5) at 3 h |

TABLE 2-continued

Mechanical Properties of Examples

| Mixture ID | SC19 | HP09 | OP08 |
|---|---|---|---|
| MPa (ksi) | 3.5 (0.5) at 24 h | 3.2 (0.5) at 5 h | 3.0 (0.4) at 24 h |
| | 5.2 (0.8) at 28 days | 5.5 (0.8) at 28 days | 5.5 (0.8) at 28 days |
| Tensile strain capacity, % | >2.0 after 4 h | >3.0 after 4 h | >3.0 after 4 h |
| Young's modulus, GPA (ksi) | 20.8 (3014) at 28 days | 22.8 (3304) at 28 days | 21.0 (3043) at 28 days |

Note:
Target Properties of 4-hour Compressive Strength ≧ 21 MPa (3 ksi); 4-hour Flexural Strength ≧ 3.5 MPa (500 psi); Long-term tensile strain capacity ≧ 2%.

In particular, the following conclusions can be drawn. Proprietary rapid-hardening cement needs to be used when stringent high early strength is required, for example, 21 MPa (3.0 ksi) within 3 hours. The exemplary mixture (SC19) delivers 34 MPa (3.5 ksi) compressive strength at 3 hours and retains tensile strain capacity above 2.0% in the long-term. A very high flexural strength of 7 MPa (1 ksi) was achieved at 3 hours.

Type III portland cement can be used as the binder together with a polycarboxylate-based high-range water-reducing admixture and calcium nitrate-based accelerator. This exemplary mixture HP09 is capable of attaining 26 MPa (3.8 ksi) at 4 hours. The mix retains strain capacity 3.5% at 50 days. A very high flexural strength of 10 MPa (1.4 ksi) was achieved at 4 hours.

In the high early strength mixtures, the development of interface frictional stress, chemical bond and slip-hardening coefficient of PVA fiber remains slow at first 24 hours, then accelerates and finally stabilizes after 14 days, while the matrix fracture toughness evolves at a faster pace and saturates after about 3 days. Micromechanics model reveals that the quick deterioration in strain capacity in SC01 and HP08 can be attributed to rapid drop of complementary energy and continuous rise of crack tip toughness. (FIG. 2).

In particular, the matrix microstructure tailoring flaw-size distribution control is necessary to promote multiple-cracking in high early strength ECC(SC19 and HP09). Introduction of artificial crack initiators with prescribed size distribution has been demonstrated to be an effective approach to retain high strain capacity at late age.

The presence of a small volume fraction of graded plastic particles with weak bond-to-cement hydrates preferably sufficient to result in nearly saturated multiple cracking. The preferable volume fraction of plastic particles is 3-7%, and yet more preferably 4-5%. The weak bond is important so that these particles do not serve as regular aggregates which could lead to a high crack tip toughness, contrary to what is needed to attain saturated multiple microcracking and high tensile ductility.

Although the bending response benefits less from the artificial flaw tailoring approach, high early strength ECC materials in general show significant deflection-hardening behavior (FIG. 3). The flexural strength reaches 10 MPa (1.4 ksi) in 4 hours and 16 MPa (2.3 ksi) at a late age (28 days) (Table 2).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A high early strength engineered cementitious composition comprising the following ingredients with the amount shown in percent by weight:
   (a) a hydraulically settable cement—38.2% to 48.5%, including hydraulic calcium silicates;
   (b) a chemical accelerator admixture—1.3% to 2.0%;
   (c) matrix interactive fibers 1.1% to 1.9%, including a polyvinyl alcohol fiber;
   (d) non-matrix interactive crack initiators —1.7% to 2.9%, including polymer beads selected from the group consisting of polypropylene, polystyrene, polyethelene, and mixtures thereof;
   (e) one or more fine grained aggregates—28.6% to 47.7%, selected from the group consisting of sand, clay, fly ash, bauxite, shale, iron ore, and mixtures thereof; and
   (f) a chemical dispersant admixture—0.2% to 1.0%, including a super-plasticizer selected from the group consisting of melamine formaldehyde sulfonate, carboxylated polyether, polycarboxylates, and mixtures thereof;
   such that when mixed in a water to cement ratio of about 0.25 to 0.5, and allowed to set, a compressive strength of 21 MPa is attained within about 4 hours and a tensile strain of greater than about 2% is maintained after curing.

2. The composition of claim 1, wherein the ingredients are present in about the following amount in percent by weight:
   (a) hydraulically settable cement—40.6% to 43.0%;
   (b) chemical accelerator admixture—1.5% to 1.85%;
   (c) matrix interactive fibers—1.4% to 1.7%;
   (d) non-matrix interactive crack initiators—1.9% to 2.6%;
   (e) fine grained aggregates—33.4% to 42.7%;
   (f) chemical dispersant admixture—0.3% to 0.9%; and
   water in a ratio of water to cement of 0.3 to 0.4.

3. The composition of claim 1 wherein the chemical accelerator admixture is mixed into the final composition prior to casting.

4. The composition of claim 1 wherein the chemical accelerator admixture is selected from the group consisting of soluble inorganic salts, soluble organic compounds, solid accelerator admixtures, and mixtures thereof.

5. The composition of claim 4 wherein the soluble inorganic salt is selected from the group consisting of chlorides, bromides, fluorides, carbonates, nitrites, nitrates, thiosulfates, silicates, aluminates, alkali hydroxides, and mixtures thereof.

6. The composition of claim 4 wherein the soluble organic compound is selected from the group consisting of thiocyanates, carboxylic acid salts, alkanolamine, calcium formate, and mixtures thereof.

7. The composition of claim 1 wherein the chemical accelerator admixture includes calcium nitrate.

8. The composition of claim 1 wherein the chemical dispersant admixture and the chemical accelerator admixture are combined.

9. The composition of claim 1, wherein the matrix interactive fiber is approximately 8 to 40 mm in length and 20 to 60 µm in diameter with a concentration of about 1 to 6 volume %.

10. The composition of claim 1, wherein the matrix interactive fiber is approximately 12 to 25 mm in length and 40 to 50 µm in diameter with a concentration of about 3 to 5 volume %.

11. The composition of claim 1 further comprising disc shaped non-matrix interactive crack initiators.

12. The composition of claim 1 further comprising cylindrical non-matrix interactive crack initiators.

13. The composition of claim 1, wherein the non-matrix interactive crack initiators are configured to create cracks with an average crack width of less than 100 µm.

14. The composition of claim 1, wherein the one or more fine grained aggregates have a mean particle size of about 50 µm to 400 µm.

15. A method for preparing the composition of claim 1, comprising the steps of:
    (a) mixing cement, fine grained aggregates, and non-matrix interactive crack initiators;
    (b) mixing the ingredients of step (a) with water;
    (c) preparing a chemical dispersant solution for combination with the mixture of step (b);
    (d) mixing the chemical dispersant with the mixture of step (b);
    (e) adding matrix interactive fibers; and
    (f) mixing the chemical accelerator with the mixture of step (e) prior to casting.

16. A method for using the composition of claim 1, comprising replacing damaged cementitious structures such that the curable composition contracts and adheres to remaining parts of the damaged structure.

17. A method for using the composition of claim 1, comprising preparing one or more structures from the composition.

18. A high early strength engineered cementitious composition comprising the following ingredients with the amount shown in percent by weight:
    (a) a hydraulically settable cement—38.2% to 48.5%, including a rapid hardening cement;
    (b) fly ash—3.8% to 4.8%;
    (c) matrix interactive fibers—1.1% to 1.9%, including a polyvinyl alcohol fiber;
    (d) non-matrix interactive crack initiators—1.7% to 2.9%, including polymer beads selected from the group consisting of polypropylene, polystyrene, polyethelene, and mixtures thereof;
    (e) one or more fine grained aggregates—28.6% to 47.7%, selected from the group consisting of sand, clay, bauxite, shale, iron ore, and mixtures thereof with a mean particle size of 50 µm to 400 µm; and
    (f) a chemical dispersant admixture 0.2% to 1.0%, including a super-plasticizer selected from the group consisting of melamine formaldehyde sulfonate, carboxylated polyether, polycarboxylates, and mixtures thereof;

such that when mixed in a water to cement ratio of 0.25 to 0.50 and allowed to set, a compressive strength of 21 MPa is attained within about 4 hours, and a tensile strain capacity of greater than about 2% is maintained after curing.

19. The composition of claim 18, wherein the ingredients are present in about the following amount in percent by weight:
    (a) hydraulically settable rapid hardening cement—40.6% to 43.6%;
    (b) fly ash—4.1% to 4.3%;
    (c) matrix interactive fibers—1.2 to 1.7%;
    (d) non-matrix interactive crack initiators—1.95% to 2.6%;
    (e) fine grained aggregates—33.4% to 42.7%;
    (f) chemical dispersant admixture—0.3% to 0.9%; and
    water in a ratio of water to cement of 0.3 to 0.4.

20. The composition of claim 18, wherein the chemical dispersant admixture and the chemical accelerator admixture are combined.

21. The composition of claim 18, wherein the matrix interactive fibers are approximately 8 to 40 mm in length and 20 to 60 µm in diameter with a concentration of about 1 to 6 volume %.

22. The composition of claim 18, wherein the matrix interactive fibers are approximately 12 to 25 mm in length and 40 to 50 µm in diameter with a concentration of about 3 to 5 volume %.

23. The composition of claim 18 further comprising disc shaped non-matrix interactive crack initiators.

24. The composition of claim 18 further comprising cylindrical non-matrix interactive crack initiators.

25. The composition of claim 18, wherein the non-matrix interactive crack initiators are configured to create cracks with an average crack width of less than 100 µm.

26. The composition of claim 18, wherein the one or more fine grained aggregates are selected from the group consisting of sand, clay, bauxite, shale, iron ore, and mixtures thereof.

27. The composition of claim 18, wherein the one or more fine grained aggregates have a mean particle size of about 50 µm to 400 µm.

28. A method for preparing the composition of claim 18, comprising the steps of:
    (a) mixing cement, fly ash, fine grained aggregates, and non-matrix interactive crack initiators;
    (b) mixing the ingredients of step (a) with water;
    (c) preparing a chemical dispersant solution for combination with the mixture of step (b);
    (d) mixing the chemical dispersant with the mixture of step (b);
    (e) adding matrix interactive fibers;
    (f) mixing prior to casting.

29. A method for using the composition of claim 18, comprising replacing damaged cementitious structures such that the curable composition contracts and adheres to remaining parts of the damaged structure.

30. A method for using the composition of claim 18, comprising preparing one or more structures from the composition.

* * * * *